UNITED STATES PATENT OFFICE.

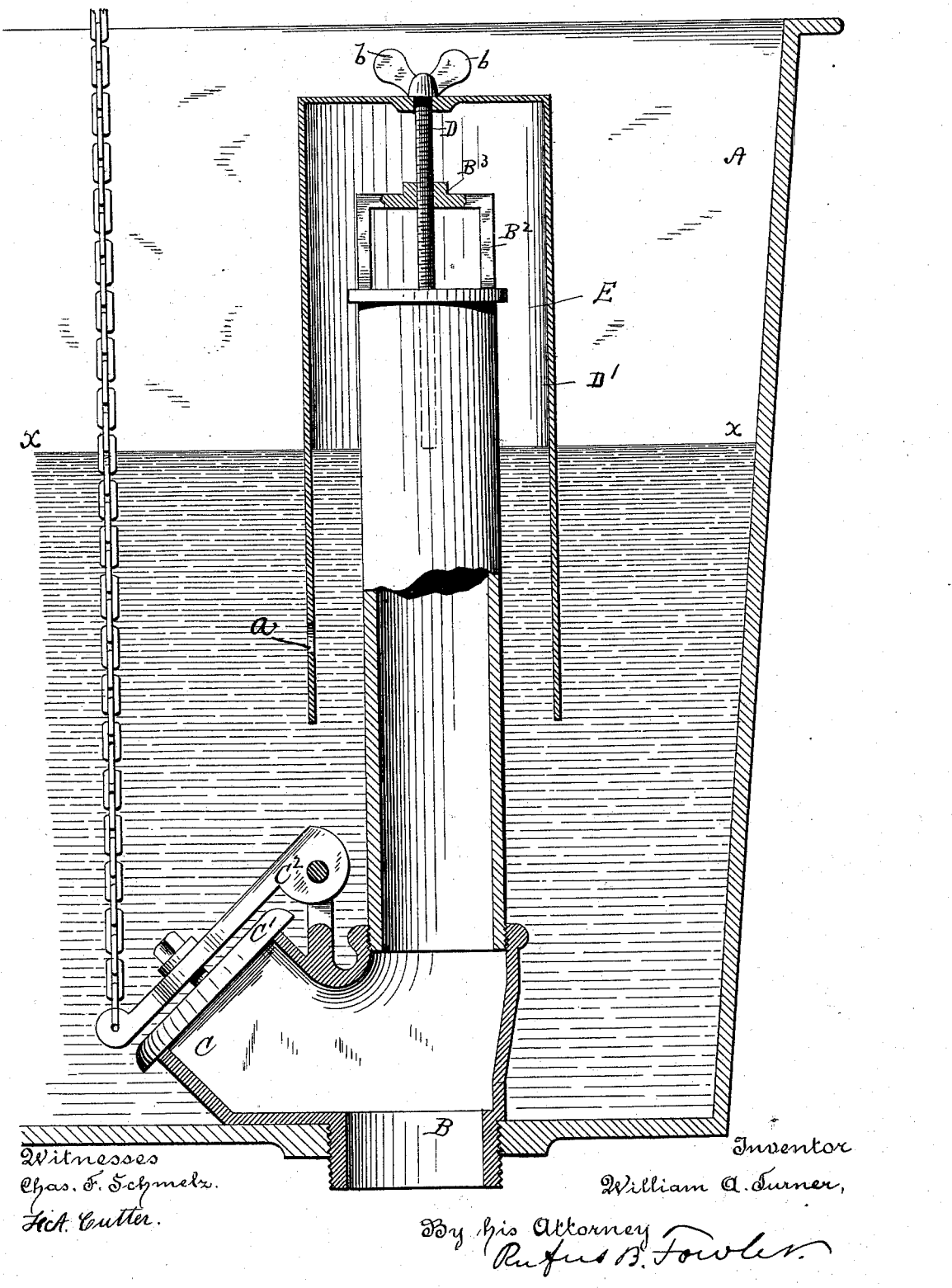

WILLIAM A. TURNER, OF WORCESTER, MASSACHUSETTS, ASSIGNOR TO EDMUND CONVERSE, OF SAME PLACE.

FLUSHING-VALVE.

SPECIFICATION forming part of Letters Patent No. 477,714, dated June 28, 1892.

Application filed November 6, 1889. Serial No. 329,437. (No model.)

*To all whom it may concern:*

Be it known that I, WILLIAM A. TURNER, a citizen of the United States, and a resident of Worcester, in the county of Worcester and State of Massachusetts, have invented a new and useful Improvement in Flushing-Valves, of which the following is a specification, reference being had to the accompanying drawing, forming a part of the same, and representing a portion of a flushing-tank containing one of my improved flushing-valves, partly shown in sectional view.

A denotes the tank or cistern, to which water is admitted through any of the known forms of ball-cock valves in the usual manner, the floating ball determining the high-water line and closing the water-supply whenever in filling the tank high-water line is reached. The water is drawn from the tank for the purpose of flushing through the opening B in the bottom of the tank, and the flushing is effected by a determinate quantity of water by means of the flushing apparatus forming the subject of my present invention and constituting what is known as a "sure supply," by which by a single pull of the chain the flow of water is started and continued until a definite quantity of water is caused to flow even if the chain is released.

Extending upwardly into the tank A from the opening B is a stand-pipe open at its upper end and forming an overflow-pipe in case the ball-cock valve fails to completely close the supply-valve when high water is reached, as indicated by the line X X. At the side of the stand-pipe and near the bottom of the tank a branch pipe C extends, with its end closed by a valve C', attached to the lever C², pivoted at one end and having a chain attached connected with a lever (not shown) and forming a chain-pull arranged in the same manner as the similar device now in common use for operating flushing-valves of water-closets. Extending upward from the upper end of the stand-pipe B' is a support B², provided with the boss B³, having a screw-threaded hole to receive the screw D, attached to the inverted cylindrical cup D', which extends downward over and concentrically with the stand-pipe B' and is provided near its lower end with the hole a. The upper end of the screw D is provided with the wings b b in order to facilitate the turning of the screw by hand.

The operation of my improved flushing-valve is as follows: The tank is filled in the ordinary and usual manner to the high-water line indicated by X X, and when a flush is desired the valve C' is raised, allowing water to flow through the branch pipe C and opening B, the downward current withdrawing the air from the air-space E, when the atmospheric pressure upon the surface of the water in the tank will cause the water to rise in the inverted cup D' and flow over the top of the stand-pipe B', the flow of water continuing until the water falls below the hole a in the wall of the inverted cup D', thereby admitting air to the space E in the cup D' and restoring an equilibrium of atmospheric pressure upon the surface within and without the cup D' and checking the flow of water through the stand-pipe B'.

It will be seen that the stand-pipe B' and the inverted cup D' form a siphon, in which the pipe B' constitutes the longer and the inverted cup D' the shorter limb, and I do not confine myself to the specific form of siphon, as shown, as any of the known forms of siphons can be employed for the purpose; but in the form shown the inverted cup or shorter limb of the siphon serves as a trap, with its lower end entering the water in the tank, thereby preventing sewer-gas from passing through the overflow-pipe and entering the room. The amount of water which will be used at each flush will be determined by the amount of water between the high-water line as fixed by the ball-cock and the hole a in the cup D', and as the high-water line X X is fixed by the ball-cock valve, and is therefore an unvarying line, I have provided for an adjustment of the opening a, by which air is admitted to the inverted cup D', and I effect this by means of the screw D, which carries the cup D', and by the rotation of the screw D the cup D', with its opening a, is raised or lowered, as desired. Air can be admitted to the siphon beneath the lower end of the cup D'; but I prefer in use to employ a small hole in the cup, as shown, in order to prevent the disagreeable gurgling sound sometimes attending the rushing of air into the siphon through a larger opening.

The instantaneous opening and closing of the valve C′ by which a flow of water is admitted to the branch pipe is sufficient to produce the siphonage of the water in the tank, and the amount of the flow is readily determined by the adjustment of the opening $a$ with reference to the water-line X X.

What I claim as my invention, and desire to secure by Letters Patent, is—

The combination, with a flushing-tank having an opening B, of the stand-pipe B′, extending vertically into said tank, lateral pipe C, valve C′, closing said lateral pipe, support $B^2$, provided with a screw-threaded boss $B^3$, screw D, and inverted cup D′, attached to said screw and provided with the opening $a$, said inverted cup extending over the end of the stand-pipe B′ and below the high-water line in the tank and being vertically adjustable by means of said screw D, substantially as described.

Dated at Worcester, in the county of Worcester and State of Massachusetts, this 4th day of November, 1889.

WILLIAM A. TURNER.

Witnesses:
E. CONVERSE,
RUFUS B. FOWLER.